| United States Patent Office | 3,453,090 |
| --- | --- |
| | Patented July 1, 1969 |

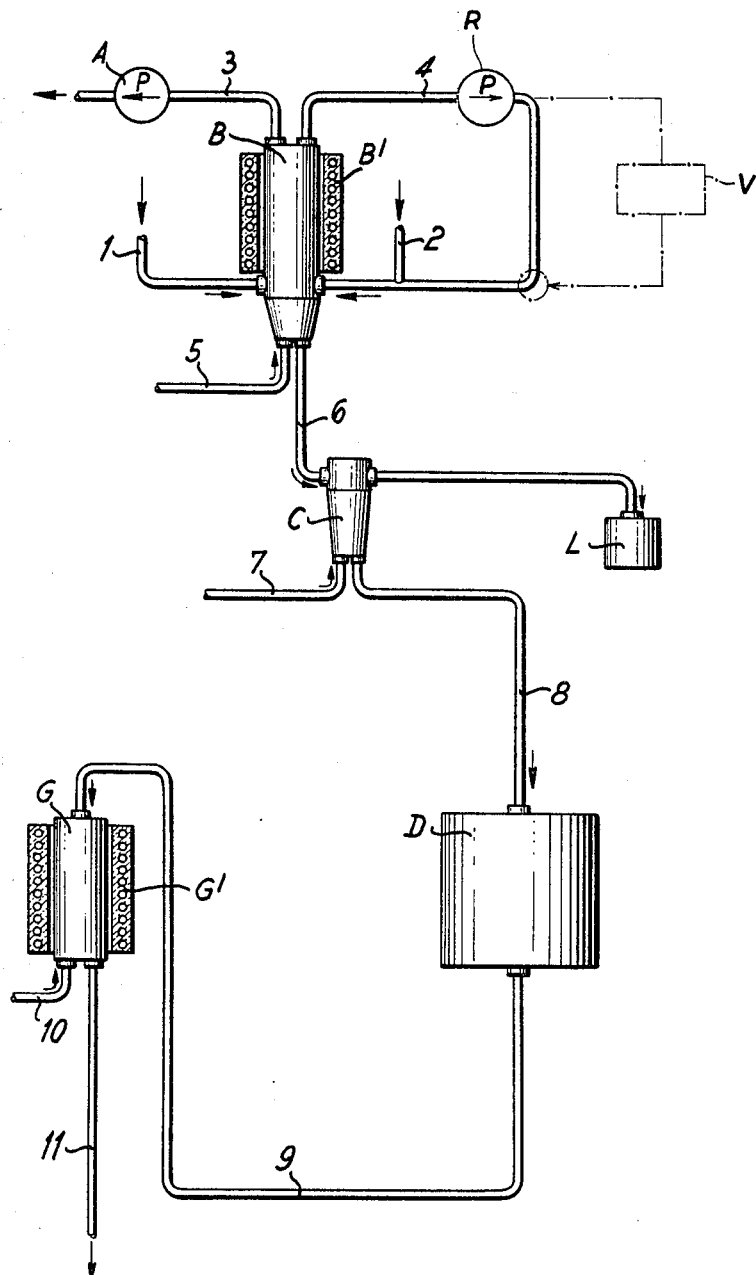

3,453,090
METHOD OF AND APPARATUS FOR THE TREATMENT OF GRAPHITE-COATED PARTICLES FOR NUCLEAR REACTORS AND THE LIKE
Rudolf Schulten, Richterich, near Aachen, Thomas Bohn, Rudolf Hecker, and Karl-Wilhelm Baurmann, Julich, Germany, assignors to Kernforschungsanlage Julich des Landes Nordrhein-Westfalen-e.V., Julich, Germany, a corporation of Germany
Filed Apr. 17, 1967, Ser. No. 631,492
Claims priority, application Germany, Apr. 23, 1966, K 59,080
Int. Cl. G21c *19/38*
U.S. Cl. 23—324        8 Claims

ABSTRACT OF THE DISCLOSURE

Method of treating coated-particle nuclear-fuel and breeder elements wherein the graphite-coated particles having a particle size of 200 to 800 microns and cores of uranium carbide, thorium carbide, plutonium, uranium oxide, thorium oxide and mixtures thereof, are subjected to treatment with cesium or potassium vapor or liquid in a rotating drum or vortex reactor at a temperature between 300° C. and 1000° C. to destroy the graphite coating and any graphite bodies in which the particles are received, and thereafter the particle cores, stripped from their graphite shell, are recovered from the graphite residue for further coating or treatment.

---

Our present invention relates to a method of treating graphite-coated particles for nuclear reactors and to an apparatus for carrying out this method.

The use of coated particles in nuclear reactors has considerable advantages over some of the types of nuclear-fuel elements or breeder elements inasmuch as the particle core, which may be composed of a fissile substance or a fertile (breeder) substance, is surrounded by a coating, sheath or shell of a nonfissionable and nonfertile material which has considerable structural integrity and serves to retain the fission fragments and radioactive residues within these particle cores and to prevent escape of highly radioactive materials from the particles. Furthermore, the fact that the uranium, thorium and plutonium particle cores are encased in shells of graphite, oxides and carbides facilitates the handling of the fuel or breeder material and the operation of the reactor.

In the commonly assigned copending applications Ser. No. 561,126 (filed June 28, 1966) and Ser. No. 617,280, now abandoned (filed February 20, 1967), for example, various aspects of the use of coated particles and graphite particle-containing bodies are described. In the commonly assigned further application Ser. No. 554,339 (filed June 1, 1966), now U.S. Patent No. 3,403,985, there is disclosed and claimed a technique whereby the desirable core materials can be recovered from the particles after they have been removed from the reactor.

In the most common cases, the core of the particles consists of uranium carbide, thorium carbide, mixtures of uranium and thorium carbides, uranium oxide, thorium oxide and mixtures of uranium and thorium oxides although plutonium and the corresponding plutonium compounds have also been used in reactors as cores of coated particles either alone or in admixture with one or more of the uranium or thorium core substances described above. The particles have diameters ranging from 200 to 800 microns and may thus be described as graphite-coated grains or granules and may be of spherical or irregular shape (see the commonly assigned copending application Ser. No. 561,126, filed June 28, 1966, and entitled "Core Element for Nuclear Reactors)."

As we have pointed out earlier, the escape of fission fragments such as gaseous products of the nuclear reaction is precluded by the use of graphite (or silicon carbide or other ceramic) shells or coatings about these cores. Other coating materials as, for example, enumerated in the above-identified copending applications, may also be used. It has, however, been found to be most desirable to employ graphite as the coating material and it may be noted that prior nuclear reactor systems have proposed that the graphite form a matrix in which the fuel substance or the fertile substance is embedded. Hollow graphite bodies have, in accordance with this proposal, been filled with particles of the nuclear-fuel or breeder substance.

In the aforementioned application Ser. No. 554,339, filed June 1, 1966, there are described a number of techniques for the recovery of the valuable components of nuclear fuel and breeder particles as well as an improved system as therein claimed. As noted in this latter application, it is possible to separate the fuel and breeder materials in the core of the particles from graphite shells or a graphite matrix by a combustion process in which the graphite is converted to carbon oxides in the presence of oxygen and thus is transformed into a gas permitting recovery of the nongasified core materials. This system has, however, the disadvantage that a large part of the radioactive material of the core is thereby released and may even be entrained in the gases or otherwise dispersed by the combustion process. Consequently, it has been necessary in such systems to provide relatively complex and expensive filter arrangements for recovering the fission fragments from the combustion gases before they are released into the atmosphere. In some cases, an apparatus of this nature does not function at a sufficiently high efficiency and there is the danger that radioactive material will be discharged into the atmosphere. Thus the last-mentioned copending application provides for a chemical recovery of the core materials from the surrounding graphitic shell whereby the particles are subjected to chemical attack in an oxide melt having an excess of alkali which serves to absorb the carbon dioxide into which the graphite is transformed. The melt thus retains not only the reaction products arising from chemical reaction with the graphite shell but also any reaction products formed by the core material and no release of radioactive substances into the atmosphere occurs. Even gaseous friction fragments, aside from the inert rare gases, are trapped and can be recovered from the melt. The latter technique has, however, the disadvantage common to most other systems described, namely the fact that the cores of the particles are destroyed and thus cannot be returned for use in the reactor without manufacture or renewal treatments.

It is, therefore, the principal object of the present invention to provide a method of enriching or treating coated-particle nuclear-fuel or breeder elements, which consist at least in part of graphite, such that the products of the treatment can be processed into renewed elements with a minimum of operation and, indeed, such that the cores of the particles themselves retain a solid structure.

This object and others which will become apparent hereinafter, are attained in accordance with the present invention, by a method of treating nuclear fuel or breeder particles consisting at least in part of graphite with a hot elemental alkali metal in the liquid or vapor state, preferably at temperatures between 300° and 1000° C. and advantageously in a system in which the particles are agitated in the treatment fluid.

The invention is based upon our discovery that it is possible, by treating graphite-coated nuclear fuel or breeder particles or graphite bodies containing the coated or uncoated particles, with the elemental alkali metal with a fluid condition of the latter and in a vortex or cyclonic fluidized-bed reactor or a rotary-drum-type furnace or reactor, to break up the graphite shell or the graphite body and obtain the naked cores which retain their integrity and are capable of reuse. Advantageously, the alkali metal, which is used in its liquid or vapor state, is either cesium or potassium. Best results are obtained with the vapor condition and, therefore, with temperatures for these metals between 300° and 1000° C. It has been found to be of especial advantage to use cesium at a partial pressure of the latter of approximately 1 torr and, therefore, a temperature on the order of 300° C.

It has been determined that substantially only radioactive inert gases can escape from the reaction system when the treatment is carried out in the manner previously described but that no other fluid materials are generated. Consequently, all of the emerging gases are of a known composition and separation of the recovered gases is not necessary. A further advantage resides in the fact that the residue of graphite can be separated from the particle cores by relatively simple means, namely, air-sifting devices because of the distinct densities of the graphite residues and the high molecular-weight core substances. Since the graphite residue and the core pellets are obtained in solid form, there are substantially no migratory substances which cannot be stopped by relatively simple and inexpensive filtering arrangements. It has been found, further, that some of the fission fragments produced during the chain reaction in the reactor penetrate into the tiny crystals of the graphite and are locked into the crystal lattice thereof so that a substantial quantity of the radioactive fragments are extracted in the graphite residue and are easily handled. Of special significance is the fact that the treatment process can be carried out effectively with breeder elements and fuel elements consisting in part of beryllium oxide since the beryllium oxide structures are not adversely affected by the treatment. Beryllium-containing bodies for the purposes previously indicated are especially significant in modern nuclear reactors as, for example, pointed out in the copending application Ser. No. 617,280, filed Feb. 20, 1967, and entitled "Absorber Element for Nuclear Reactors."

Since the fragments of the fission reaction have a mean free path of about 5–10 microns before they are absorbed and their energy transferred completely to the coating material, the present invention has a still greater advantage in that the solid graphite traps these fission fragments in the interstices of its crystal lattice. Consequently, it is possible to work up the graphite residue when these fission fragments are to be recovered or to use the graphite residue as a trap for these fragments which, consequently, do not require chemical separation from any reaction medium. When the present system is carried out with mixtures of graphite particles and fuel particles of thorium or uranium carbide, the fission fragments are trapped in the graphite residue and can be separated with the latter from the thorium/uranium carbide cores in, for example, an air sifter. Thus, the thorium/uranium carbide cores can be recoated with a minimum of further purification steps while the graphite can be subjected to decontamination or otherwise treated if recovery of the trapped fragments is desired.

The above and other objects, features and advantages of this invention will become more readily apparent from the following description and the specific examples, reference being made to the accompanying drawing, the sole figure of which is a flow diagram, with parts in elevation, illustrating a system for carrying out the present invention.

In the drawing, we show a reaction vessel B which is surrounded by a heating jacket B' provided with electric-heating coils. The jacket is, according to this invention, designed to bring the temperature within the reaction vessel B to a level in the range of 300° C. to 1000° C. A particle-delivery line 1 communicates with the vessel B, which represents a rotary-drum reactor (e.g. of the type shown in Perry's Chemical Engineers' Handbook, 4th edition, McGraw-Hill Publishing Co., New York, pages 20–16 to 20–32) with respect to contact of solid particles with the fluid medium or a vortex-type cyclonic system which may be, in effect, a fluidized bed (cf. ibid., pages 20–42 through 20–57). The nuclear-fuel or breeder particles metered into the reaction vessel B via line 1 (and dosing means not shown) are reacted therein with a fluid of an alkali metal, preferably cesium or potassium, the elemental alkali metal being delivered in liquid or gaseous state via the line 2 to the vessel B.

According to an important feature of this invention, the reaction vessel B is evacuated by means of a pump A communicating with the vessel B via a line 3. We have found it desirable, in order to achieve maximum reactor efficiency and economy, to circulate the alkali metal in its flowable state as represented diagrammatically by the line 4. A pump R can be provided for the recirculation of the cesium or potassium in the circulation line 4. When the pump R is omitted, the refluxing action of the alkali metal can be effected by a sparging or flushing gas which is introduced into the reaction vessel B via line 5 and agitates the particles within the vessel B while effectively carrying the cesium vapor around and through the reaction mass. The reaction time in vessel B is relatively short so that, after a short initial period wherein the alkali metal vapor acts upon the core of the boated particles and its graphitic shell, a quantity of graphite powder, substantially equal to the graphite contained in the coated particles, can be recovered at the base of the vessel B and drawn off via a line 6. The core remains substantially intact and is separated from the graphite particles in a cyclonic system (cf. Perry's Chemical Engineers' Handbook, op. cit. pages 20–68 ff.). From the air sifter C, the particle portions which still contain fission products are collected in a vessel L and/or are passed via line 8 and subjected to radioactive decontamination in the vessel D. The line 7 admits the ascending airstream into the cyclonic sifter C from below.

From the decontamination vessel, the cores, which remain undestroyed and maintain their integrity, are carried via a line 9 to a vortex furnace G in which the cores are subjected to a coating gas containing organic substances which may be thermally decomposed to elemental carbon, for example, thereby pyrolytically precipitating graphite around these cores. The pyrolytically decomposable gas is introduced via line 10, while the vortex-fluidized-bed reactor G is surrounded by a heating jacket G' capable of raising the temperature within the vessel to that required for pyrolytic deposition of graphite. The coated particles recovered at 11 can be then introduced into the metal jacket of a fuel element for use in a nuclear reactor (see the commonly assigned copending application Ser. No. 498,786, filed October 20, 1965, and entitled "Fuel Element for Liquid-Cooled Nuclear Reactors," now abandoned, or the commonly assigned copending application Ser. No. 518,072 of January 3, 1966, now U.S. Patent No. 3,354,043, entitled "Fuel Element for Nuclear Reactors").

EXAMPLE I

Fuel elements consisting of graphite balls or shells (see the commonly assigned copending application Ser. No. 518,298 of January 3, 1966, entitled "Nuclear Reactor and Method of Operating Same"), the spherical shells or balls being filled with graphite-coated particles of thorium/uranium carbide nuclear fuel (e.g. of the type described in the commonly assigned copending applications Ser. No. 554,339, filed June 1, 1966, and entitled "Method of Treating Coated-Particle Nuclear Reactor Fuels" or Ser. No. 561,126, filed June 28, 1966, and entitled "Core Element for Nuclear Reactors"). These particles are introduced into the reactor vessel of the type illustrated in the drawing, the reactor vessel being then evacuated. Elemental cesium, at a temperature of about 30° C., is introduced into the reaction vessel and the temperature of the resulting mixture raised to 300° C. while nitrogen is introduced at 5 to agitate the mass and effect an intimate contact between the cesium vapor and the coated particles. After a period between 1 and 3 hours, the graphite is separated in particulate form from the nuclear cores and the particle mixture is introduced into the cyclonic separator C in which air sifting separates the nuclear cores. The process can then be carried out continuously with the fuel element having a reaction time within the vessel B of 1 to 3 hours as indicated. The cesium can be shunted into a collecting vessel V and then cooled to a temperature of approximately ambient or a room temperature (25° to 30° C.) before being returned to the cycle. The graphite is decontaminated and the nuclear cores of uranium/thorium carbides are reused.

When the temperature was raised to 1000° C. and potassium substituted for cesium, a similar result was obtained.

EXAMPLE II

The process of Example I was carried out using 100 grams of cesium at a temperature of 280° C. and a cesium-partial pressure of one atmosphere and 400 grams of graphite-coated particles were treated. In a period of a few minutes the graphite was stripped from the cores, recovered intact and thereafter recoated with pyrolytic graphite as described, for example, in "Journal of Nuclear Materials," volume 11, No. 1 (1964), pages 1-31.

The method of Examples I and II was carried out with particles having a particle size of 200 to 800 microns and regular and irregular outer configurations. The pyrolytic graphite layer had a thickness of substantially 50 to 150 microns while the cores were composed of uranium carbide, thorium carbide, platinum, uranium oxide, thorium oxide and mixtures thereof. In substantially all of these cases, the cores were recovered generally intact and in a condition suitable for recoating.

The invention described and illustrated is believed to admit of many modifications within the ability of persons skilled in the art, all such modifications being considered within the spirit and scope of the appended claims.

We claim:

1. A process for the chemical reprocessing of coated-particle nuclear-fuel and breeder elements having cores of fissionable or fertile material encased in a graphite coating and having a particle size in the range of about 200 to about 800 microns, comprising the steps of treating the particles at a temperature of about 300° C. to about 100° C. with a fluid consisting essentially of at least one elemental alkali metal at a pressure of about 1 torr to break up the graphite coatings, and thereafter separating the particle cores from the graphite residue.

2. The process defined in claim 1 wherein the alkali metal is cesium or potassium.

3. The process defined in claim 1 wherein the coated particles are treated with the alkali metal in a liquid state thereof.

4. The process defined in claim 1 wherein said coated particles are treated with the alkali metal in the vapor state thereof.

5. The process defined in claim 4 wherein the treatment of said coated particles with said alkali metal is carried out in a vortex fluidized bed.

6. The process defined in claim 1 wherein the treatment of said coated particles with said alkali metal is carried out while said particles are tumbled.

7. The process defined in claim 1 wherein said alkali metal is cesium and the reaction is carried out at a temperature of the order of 300° C. and a cesium partial pressure of substantially 1 torr.

8. The process defined in claim 1 wherein: said coated particles are enclosed in graphite bodies prior to treatment with said alkali metal and said bodies are broken up by the treatment; said alkali metal is selected from the group of cesium and potassium; the treatment of said bodies and particles with said alkali metal is carried out for a period ranging between several minutes and several hours; the graphite residue is separated from the cores of said particles by air sifting; the cores recovered by air sifting from the graphite residues are coated with graphite for reuse in a nuclear reactor; and the cores of said particles are composed of uranium carbide, thorium carbide, plutonium, uranium oxide or thorium oxide and mixtures thereof.

References Cited

UNITED STATES PATENTS

| | | | |
|---|---|---|---|
| 3,219,408 | 11/1965 | Bradley et al. | 23—324 |
| 3,260,574 | 7/1966 | Hatch et al. | 23—324 |
| 3,316,065 | 4/1967 | Baertschi et al. | 23—324 |

OTHER REFERENCES

M. E. Ihnat, The Reaction Of Glasses, Pyrolytic Graphite, and Selected Refractories With Sodium Vapor at Elevated Temperatures, Nuclear Science Abstracts 16–25318, October 1962.

G. Arthur, Compatibility of Some Refractory Materials with Cs Vapor, Nuclear Science Abstracts 19–9628, March 1965.

CARL D. QUARFORTH, Primary Examiner.

MICHAEL J. McGREAL, Assistant Examiner.

U.S. Cl. X.R.

134—6